(12) United States Patent
Burton et al.

(10) Patent No.: US 7,506,184 B2
(45) Date of Patent: Mar. 17, 2009

(54) CURRENT DETECTION FOR MICROELECTRONIC DEVICES USING SOURCE-SWITCHED SENSORS

(75) Inventors: Edward Burton, Hillsboro, OR (US);
Robert Greiner, Beaverton, OR (US);
Anant Deval, Beaverton, OR (US);
Doug Huard, Portland, OR (US); Dave Perchlik, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 11/431,739

(22) Filed: May 9, 2006

(65) Prior Publication Data
US 2007/0266262 A1 Nov. 15, 2007

(51) Int. Cl.
*G06F 1/00* (2006.01)
*H02J 3/32* (2006.01)
*G05F 1/00* (2006.01)
(52) U.S. Cl. .................. 713/300; 307/45; 323/271
(58) Field of Classification Search .................. 713/300
See application file for complete search history.

(56) References Cited

U.S. PATENT DOCUMENTS

| | | | |
|---|---|---|---|
| 4,308,492 A * | 12/1981 | Mori et al. ............ 322/28 |
| 6,954,054 B2 | 10/2005 | Brown |
| 6,977,488 B1 | 12/2005 | Nogawa et al. |
| 6,982,499 B1 * | 1/2006 | Kachi et al. .............. 307/75 |
| 7,027,944 B2 | 4/2006 | Tabaian et al. |
| 7,123,104 B2 | 10/2006 | Bostak et al. |
| 7,215,108 B2 | 5/2007 | Inn et al. |
| 7,221,130 B2 | 5/2007 | Ribeiro et al. |
| 7,292,016 B2 | 11/2007 | Wake |
| 7,345,379 B2 * | 3/2008 | Okayama et al. ........ 307/45 |
| 2006/0145678 A1 | 7/2006 | Ribeiro et al. |

OTHER PUBLICATIONS

"42P23986 Office Action Mailed Oct. 18, 2007 for U.S. Appl. No. 11/431,256", (Oct. 18, 2007), Whole Document.

* cited by examiner

*Primary Examiner*—Suresh K Suryawanshi
(74) *Attorney, Agent, or Firm*—Blakely, Sokoloff, Taylor & Zafman LLP

(57) ABSTRACT

A method and apparatus for current detection for microelectronic devices using source-switched sensors. An embodiment of a current detector for a microelectronic device includes a first voltage sensor and a second voltage sensor. The first voltage sensor is to measure a first voltage of the microelectronic device during a first time period and a second voltage of the microelectronic device during a second time period. The second voltage sensor is to measure the second voltage during the first time period and the first voltage during the second time period. A voltage value is equal to the sum of the first voltage measured by the first sensor plus the first voltage measured by the second sensor, minus the sum of the second voltage measured by the first sensor plus the second voltage measured by the second sensor. Other embodiments are also described and claimed.

28 Claims, 7 Drawing Sheets

CURRENT DETECTION FOR MICROELECTRONIC DEVICES USING SOURCE-SWITCHED SENSORS

FIELD

An embodiment of the invention relates to electronic devices in general, and more specifically to current detection for microelectronic devices using source-switched sensors.

BACKGROUND

In the operation of microelectronic devices, including microprocessors, the control of power applied to such devices can be a vital issue. For example, the voltage applied to a microelectronic device generally has a direct effect on the speed of operation of the device, which thus impacts the system performance. Conversely, the voltage level applied to a microelectronic device negatively affects the lifespan of the device, with excessive voltages resulting in shortened operational life. The power supply delivering current to a microprocessor may be designed for less than the maximum theoretical current draw of the microprocessor, and in this case a circuit is needed to ensure the microprocessor current does not exceed the maximum current allowed. If it is determined that the current draw of the microprocessor exceeds the maximum allowed, then the frequency and voltage of the microprocessor can be reduced to bring the current back within the current draw limit. For this reason, voltages and currents may be closely monitored in the operation of a device.

However, relevant values for a device can be difficult to detect. For example, the determination of certain current values may be challenging because the values are relatively low, while the variances involved can be significant. In particular, variances in sensor operation and variances in noise levels over time may make it difficult to accurately determine a current value for a device. Because of the uncertainty in measures, it may be necessary to implement larger operational safeguards to protect operation of the device, thus reducing the performance of the device.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
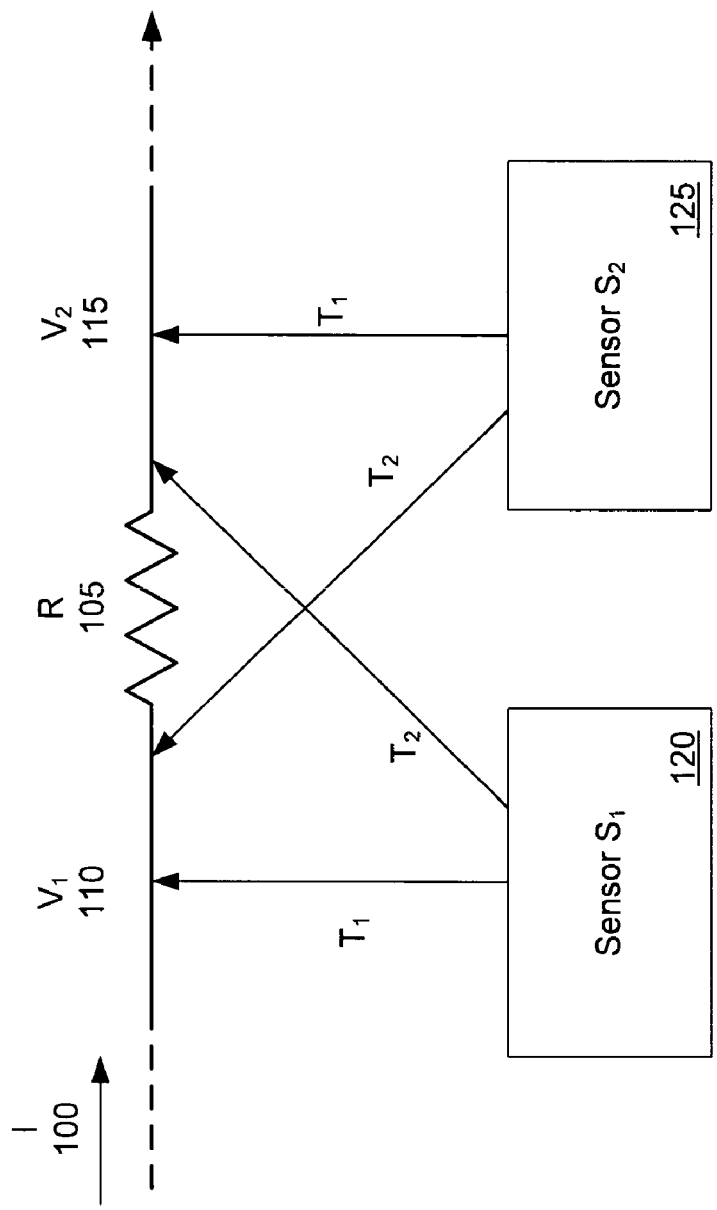
FIG. 1 is an embodiment of a current detector using source-switched sensors.

A method and apparatus are described for current detection for microelectronic devices using source-switched sensors.

As used herein, a "ring oscillator" is a device in which a signal is inverted an odd number of times and fed back to the first input, thereby resulting in an oscillation. For example, a ring oscillator may be composed of an odd number of logic gates such as NOT gates or inverters, with an output that oscillates between two voltage levels, thus representing high and low (or true and false) values.

Since the practical maximum current or power for a microprocessor or other similar microelectronic device is often much lower than the theoretical maximum current or power that may be drawn by such device, there is often a significant cost advantage in designing the power supplies for such devices to the practical maximum rather than the higher theoretical maximum. However, capitalizing on this cost opportunity generally requires a safety feature to protect against the theoretical maximum draw in power or current. In order to implement such a safety feature, it is necessary to monitor the current for the device. In this monitoring process, it may be necessary to determine the current through a resistance, such as a parasitic resistance of the device, which may be accomplished by measuring a voltage level drop across the resistance. However, the voltages involved may be very small, and thus are strongly susceptible to variances.

In an example, the major variances in such voltage detections are variances between sensors in their operation and variances in noise levels for a power supply over time. In one embodiment of the invention, a system addresses the detection variances by providing for current detection for a microelectronic device using multiple sensors. In one embodiment, each of the sensors is a ring oscillator sensor. In an embodiment of the invention, the ring oscillator sensors make multiple measurements to allow switching the sources of the sensors, which thus acts to offset at least a portion of the detection variances.

In an embodiment of the invention, a pair of sensors can be selectively attached before or after (upstream and downstream) of a resistance of a microelectronic device, such as the parasitic resistance of the device. For example, a first sensor $S_1$ may measure a first upstream voltage during a time period $T_1$, while a second sensor $S_2$ measures a first downstream voltage during the same time period $T_1$. The sensors may then be switched, such that the first sensor $S_1$ measures a second downstream voltage at a time $T_2$, while the second sensor $S_2$ measures a second upstream voltage at time $T_2$. The four measurements thus act to counter the primary causes of variation, with both sensors being used at the same times to help offset the effect of variations in time, while the sensors are also switched from upstream and downstream measurement to address the variation in devices. While this example utilizes two sensors, embodiments of the invention are not limited to any particular number of sensors, and additional sensors can be used to provide more measurements.

In one embodiment of the invention, a sensor may be a ring oscillator sensor. A ring oscillator sensor includes a gray code counter, a sampler, and a subtractor to calculate the new sample minus the old sample. Essentially, the operation of the ring oscillator is based on the voltage, a higher voltage resulting in a higher count, the result of a measurement being the count of the oscillator during the time period. A sensor retains a sample value, and thus during a time period the measurement will be equal to the difference between a new sample at the end of the period minus an old sample from the beginning of the period. The switching of the two oscillators may be done 180 degrees apart such that a first sensor is sensing upstream as the second sensor is sensing downstream in a first time period. The sources of the sensors are then swapped such that the first sensor is sensing downstream and the second sensor is sensing upstream during a second time period.

Thus, each measurement cycle over a first time period $T_1$ and a second time period $T_2$ thus produces for intermediate results:

$RO_1\_upstream\_T_1$
$RO_1\_downstream\_T_2$
$RO_2\_downstream\_T_1$
$RO_1\_upstream\_T_2$ The combination thus results in a total delta value for the ring oscillator sensor that may be determined as the sum of the upstream values minus the sum of the downstream values:

$$RO\_delta=(RO_1\_upstream\_T_1+RO_2\_upstream\_T_2)-\\(RO_1\_downstream\_T_2+RO_2\_downstream\_T_1)$$

To a first order, this formulation cancels two error sources, which are often the largest sources of error. The two cancelled error sources are the process variation between the two ring oscillator sensors and the voltage variation between the two time intervals ($T_1$ and $T_2$). The variation with respect to time is primarily due to noise on the power supply, which is particularly problematic when there is a load current that is synchronous to the measurement sampler.

In a particular example, it is assumed that a first ring oscillator sensor $RO_1$ counts nominally to 1000 over a time period while a second ring oscillator $RO_2$ nominally counts to 1050 over the same time period. It is further assumed that $T_1$ is a "nominal" time period while measurement for a time period $T_2$ is 5% faster due to a higher voltage caused by some external noise source. In this example, it is assumed that there is a zero current draw, which thus means that the measurement should be zero. However, the following readings would occur:

$RO_1\_upstream\_T_1=1000$
$RO_2\_upstream\_T_2=1102$ (with a 0.5 remainder)
$RO_1\_downstream\_T_2=1050$
$RO_2\_downstream\_T_1=1050$ The resulting error (because there is zero current draw) thus would be:

$$RO\_delta=1000+1102-1050-1050=2$$

To compare, if a single RO sensor had been used and timesliced to provide both measurements (a first sensor measuring upstream during time period $T_1$ and then downstream during time period $T_2$), then the result would have been:

$$RO\_delta = RO_1\_upstream\_T_1 - RO_1\_downstream\_T_2\\= 1000 - 1050 = -50$$

As a second comparison, if two sensors had been used, with each measuring at the same time (a first sensor measuring upstream at $T_1$ and measuring downstream at $T_2$), then the result would have been:

$$RO\_delta = RO_1\_upstream\_T_1 - RO_2\_downstream\_T_1\\= 1000 - 1050 = -50$$

Thus, in this example the measurements resulting from a single sensor at two times and the measurement resulting from two sensors at a single time are both much higher, 25 times higher in this particular example.

FIG. 1 is an embodiment of a current detector using source-switched sensors. In this illustration, a current I 100 passes through a resistance R 105. The resistance R 105 may be a resistance of a microelectronic device, including a microprocessor. The resistance may represent a parasitic resistance of the device. In order to detect the current I 100, a voltage drop is determined across the resistance, which may be determined by measuring an upstream voltage $V_1$ 110 and a downstream voltage $V_2$ 115.

In an embodiment of the invention, the voltages are determined by detecting the upstream voltage and the downstream voltage with separate sensors, and then reversing the sensors to eliminate some of the inaccuracies in the process. In an embodiment of the invention, the sensors utilized are ring oscillator sensors. For example a first sensor, sensor $S_1$ 120, detects an upstream voltage $V_1$ 110 during a first time period $T_1$. During the same time period $T_1$ a second sensor, sensor $S_2$ 125, detects a downstream voltage $V_2$ 115.

In order to minimize the effect of variances in the sensors, as well at to counter variances in the results that occur as a result of noise, the sources for the sensors are switched. Thus, sensor $S_1$ 120 then detects the downstream voltage $V_2$ 115 during a second time period $T_2$. During the same time period $T_2$ sensor $S_2$ 125 detects the upstream voltage $V_1$ 110. In an embodiment of the invention, the results are combined to provide a difference result that offsets the major sources of error:

$$\Delta=S_1(T_1)-S_2(T_1)-S_1(T_2)+S_2(T_2)$$

Figure 2:
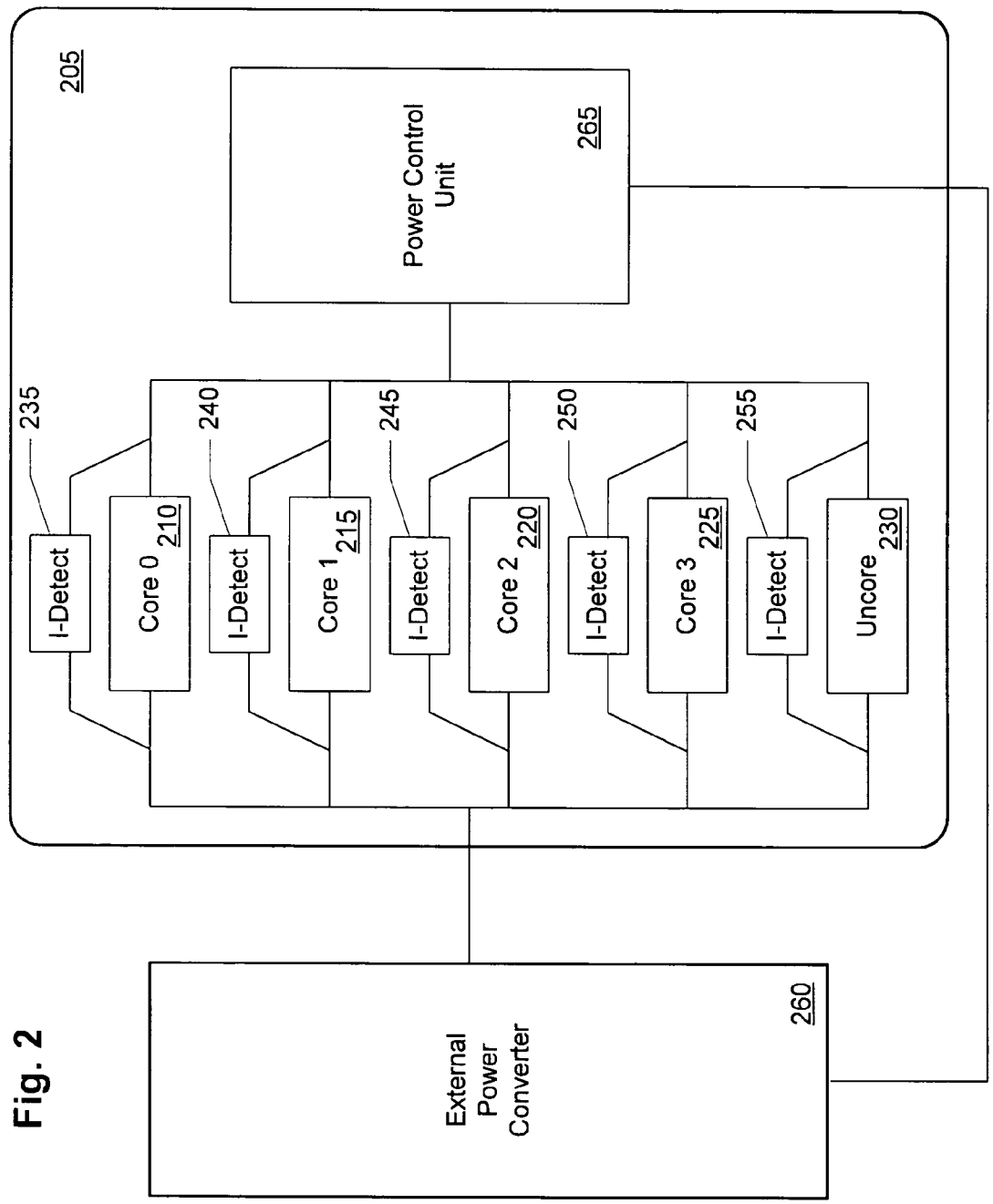
FIG. 2 illustrates an embodiment of a microprocessor with a power control unit.

FIG. 2 illustrates an embodiment of a microprocessor with a power control unit. In this illustration, a microprocessor 205 includes a number of processing cores, shown here as processing cores 0 through 3 (elements 220-225) and an uncore 230 to provide other device functions. Each processing core executes instructions, and may operate as an independent microprocessor to permit thread-level parallelism. As used herein, the term "processing cores" does not necessarily refer to symmetric cores of uniform size and capability. "Processing core" can refer to any large block of incremental computational capability. In one embodiment, each core is substantially similar to the other cores. In another embodiment, one or more of the cores has a different structure, size, or function from the other cores. In an embodiment of the invention, the microprocessor 205 also includes a power control unit 265, the power control unit to control the power provided to the microprocessor 205. The microprocessor 205 may include multiple resistances such as the resistance 105 illustrated in FIG. 1.

In an embodiment, the microprocessor 205 is coupled with an external power converter 260 that converts power for usage by the microprocessor 205. In one embodiment, the external power converter 260 is a programmable DC-to-DC (switch-mode) power converter to provide power to the microprocessor 205.

In an embodiment of the invention, the external power converter 260 may include a pulse-width modulation (PWM) controller, one or more power transistors, filter and decoupling capacitors, and one or more large inductors and/or transformers. In an embodiment, the power control unit 265 regulates the voltage applied to the microprocessor 205 by the external power converter 260. In an embodiment of the invention, the regulation of the voltage is based at least in part on current measurements made for the microprocessor 205. In an embodiment of the invention, the current measurements may be made by one or more current detectors 235-255. Each current detector may detect a current through a particular resistance, which may be accomplished by measuring a voltage drop across the resistance. As illustrated, multiple current detectors 235-255 are provided, with each current detector being utilized to measure a current for one of the functional blocks (cores 210-225 or the uncore 230) of the microprocessor 205. However, embodiments of current detectors are not limited to this particular arrangement, and may be used to measure other resistances of a microelectronic device.

Figure 3:
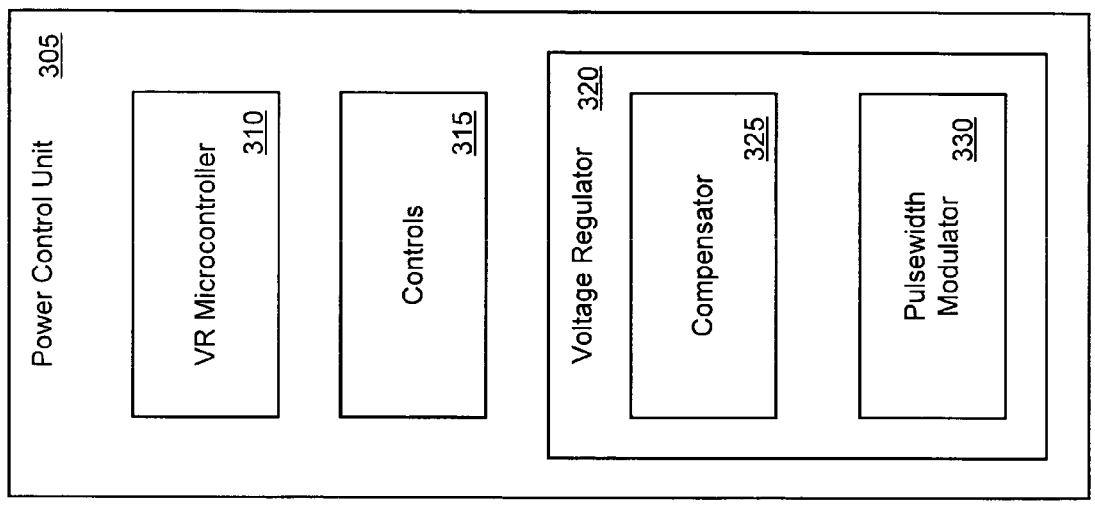
FIG. 3 illustrates an embodiment of a power control unit for a microprocessor.

FIG. 3 illustrates an embodiment of a power control unit for a microprocessor. In FIG. 3, a power control unit 305, which may, for example, be the power control unit 265 illustrated in FIG. 2, includes a voltage regulator (VR) microcontroller 310 to control the operation of voltage regulation operations for the device. VR microcontroller 310 provides voltage control configuration parameters that are implemented to control voltage. The power control unit 305 may further include a set of controls 315 to control voltage parameters for the microprocessor. The controls may include a ramp rate control (to address the ramp rate, or rate of change, of voltages), a load-line adjustment (to adjust the DC, direct current, loadline of the microprocessor), and a power throttle (to provide throttling of power for the microprocessor as necessary).

The power control unit 305 further includes a voltage regulator 320, which includes a compensator 325 and a pulse width modulator 330. The compensator receives a target voltage from the set of controls 315 and compares the target voltage to an actual voltage received from one or more of the microprocessor cores. The compensator 325 then produces an error value to compensate for the difference between the target voltage and the actual voltage. The pulse width modulator 330 generates pulse signals to control the width of signals produced by the external power converter, thereby controlling the power applied to the device. In embodiment of the invention, signals produced by the voltage regulator 320 depend as least in part on a measurement of a current using source switched sensors.

Figure 4:
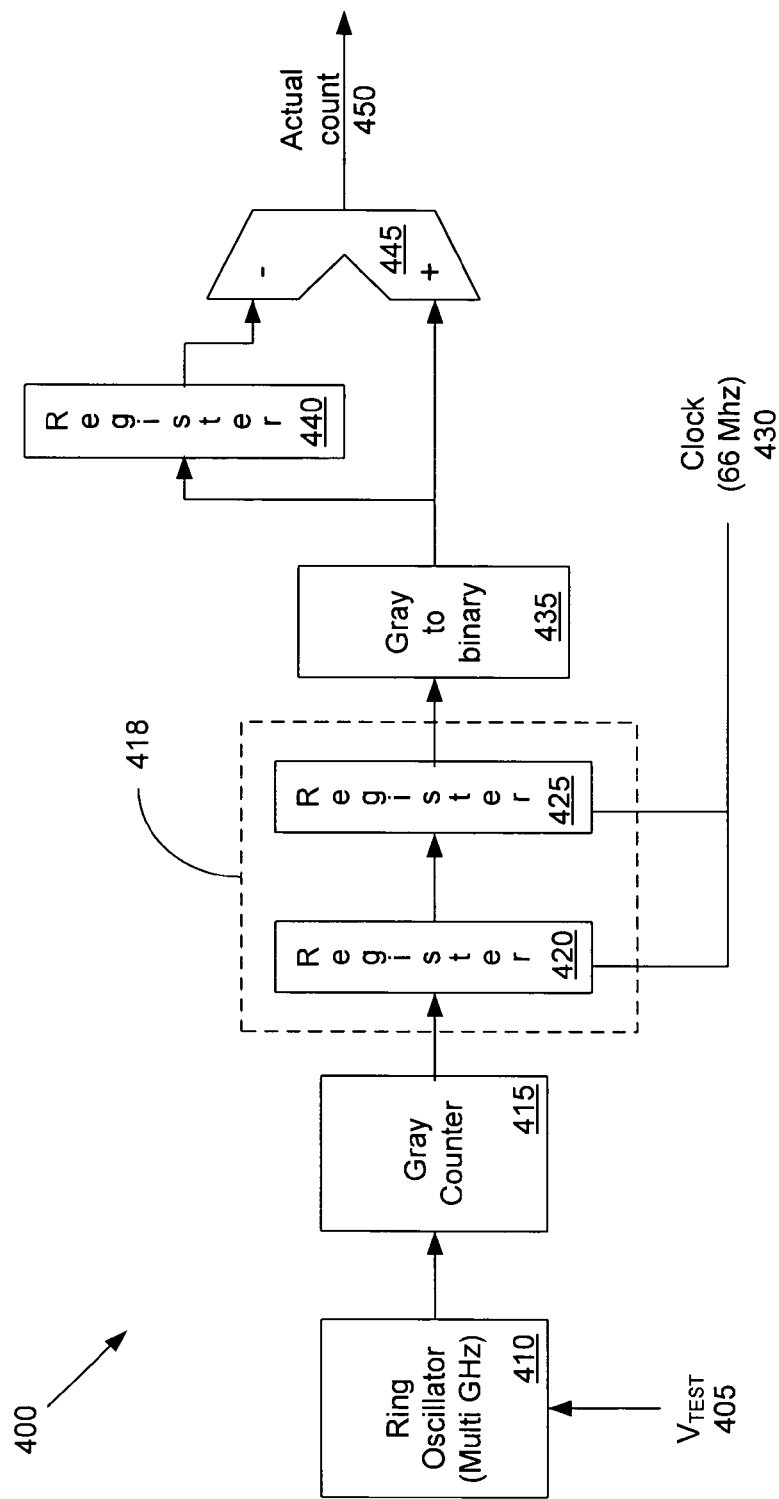
FIG. 4 is an illustration of an embodiment of a ring oscillator sensor.

FIG. 4 is an illustration of an embodiment of a ring oscillator sensor. In this illustration, a ring oscillator sensor 400 senses a voltage $V_{TEST}$ 405. The voltage is applied to a ring oscillator 410, which may oscillate at a very high frequency (illustrated as multiple GHz.). The output of the ring oscillator 410 is counted by a gray code counter 415. An output of the gray code counter 415 may be sampled by a sampler 418, which may include a first register 420 and a second register 425. The first register 420 and the second register 425 may be clocked by a clock source 430, the clock source 430 being illustrated as operating at a common 66 MHz. frequency. In one embodiment, the first register 420 and the second register 425 may be flip-flop devices, which may, for example, be triggered by a rising signal edge. An output of the sampler 418 is presented to a gray code to binary code converter 435 to convert the gray code values to binary. The binary output is presented to a first input of a subtractor 445 and to a third register 440, which is used to hold the previous count value. An output of the third register 440 is coupled with a second input of the subtractor 445. The subtractor 445 subtracts the previous count value, as stored in the third register 440, from the current count value received from the gray to binary converter 435 to generate the actual count output 450 of the sensor 400.

Figure 5:
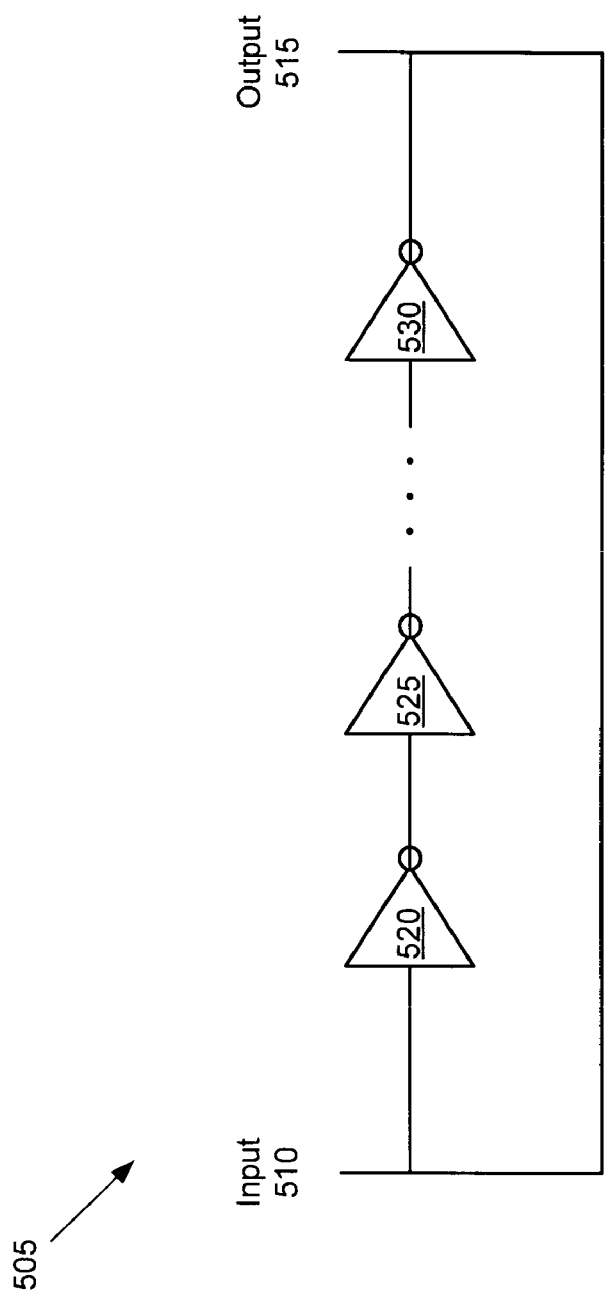
FIG. 5 illustrates a ring oscillator for use in an embodiment of the invention.

FIG. 5 illustrates a ring oscillator for use in an embodiment of the invention. A ring oscillator 505 may include the ring oscillator 410 illustrated in FIG. 4. A ring oscillator 505 may include an odd number of inverters that are coupled in series to pass a signal through each inverter, and then feed back the signal in a loop. In this illustration, the ring oscillator includes an input 510 and an output 515. The input 510 is passed to the input of a first inverter 520. The output of the first inverter 520 is fed to the input of a second inverter 525, and continuing through to the input of an nth inverter 530, where n is an odd number. The output of the nth inverter 530 is fed back to the input of the first inverter 520.

Figure 6:
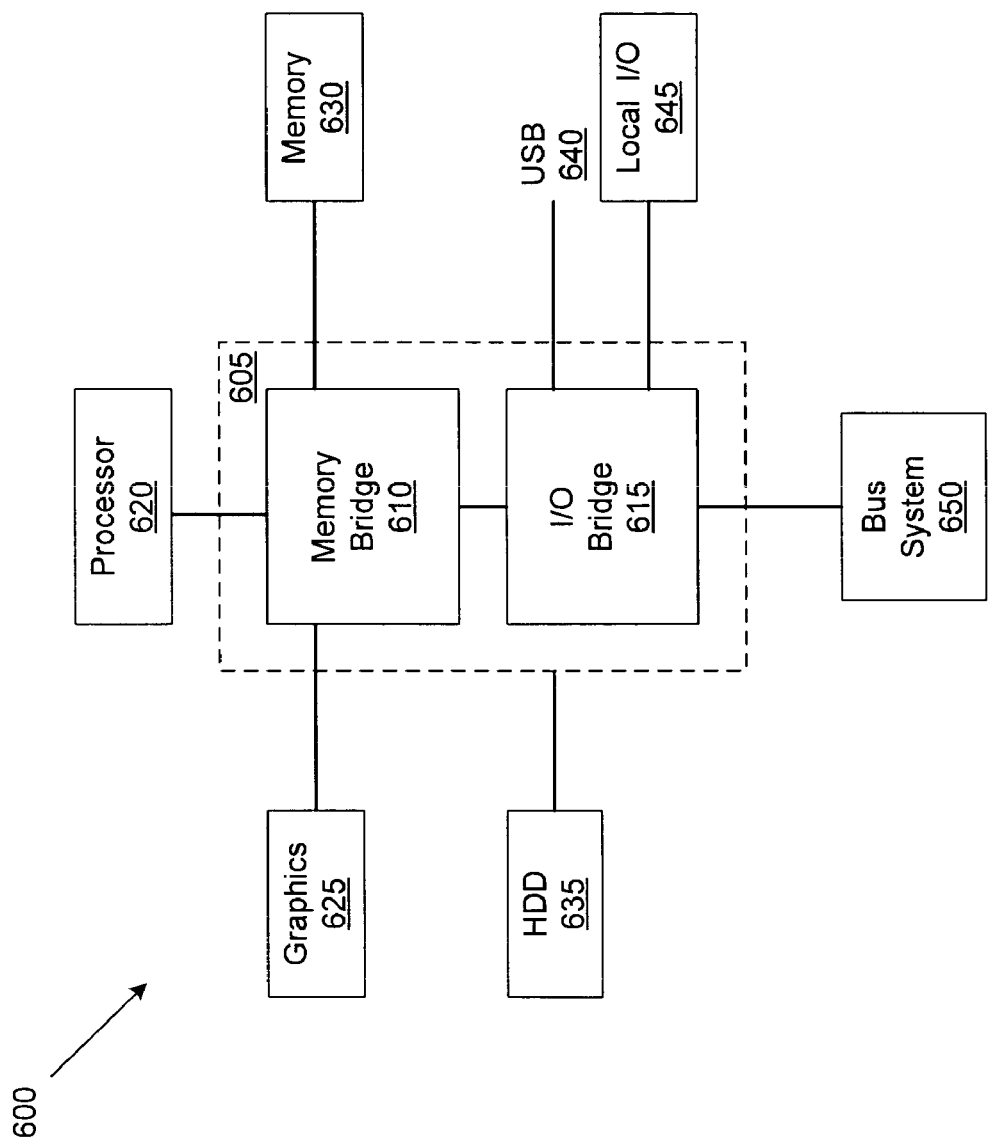
FIG. 6 illustrates an embodiment of a computer system architecture.

FIG. 6 illustrates an embodiment of a computer system architecture. In this illustration, a computer system 600 includes a memory bridge 610 and an I/O (input/output) bridge 615, which may form part of a unit or chipset 605. The memory bridge may be coupled with a processor 620 (a central processing unit or CPU), to graphics 625 for display, and to memory 630 for data storage. The memory bridge 610 is coupled with the I/O bridge 615, which is in turn coupled with a hard disk drive (HDD) 635 or similar device for persistent data storage, a link such as a USB (universal serial bus) 640, local I/O 645, and a bus system 650.

Figure 7:
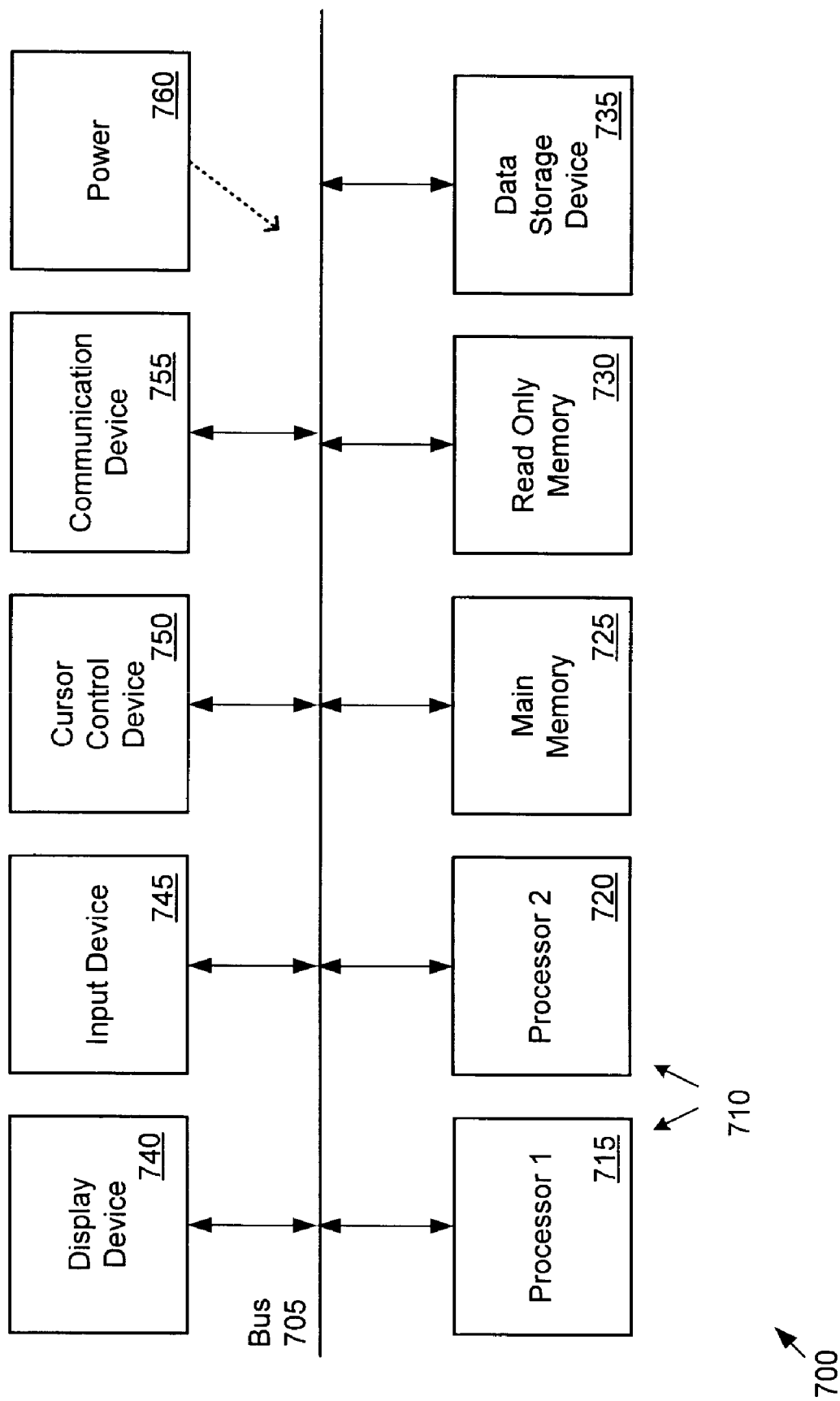
FIG. 7 is an illustration of a computer system that may be used in an embodiment of the invention.

FIG. 7 is an illustration of a computer system that may be used in an embodiment of the invention. Certain standard and well-known components that are not germane to the present invention are not shown. Under an embodiment of the invention, a computer 700 comprises a bus 705 or other communication means for communicating information, and a processing means such as two or more processors 710 (shown as a first processor 715 and a second processor 720) coupled with the bus 705 for processing information. The processors 710 may comprise one or more physical processors and one or more logical processors. Further, each of the processors 710 may include multiple processor cores. In one embodiment, the processors 710 represent processors in the Itanium® family of processors, including the Itanium® 2 processor, available from Intel Corporation of Santa Clara, Calif. However, embodiments of the invention are not limited to any particular processor. The computer 700 is illustrated with a single bus 705 for simplicity, but the computer may have multiple different buses and the component connections to such buses may vary. The bus 705 shown in FIG. 7 is an abstraction that represents any one or more separate physical buses, point-to-point connections, or both connected by appropriate bridges, adapters, or controllers. The bus 705, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) In an embodiment of the invention, each of the processors 710 includes a power control unit to control the power supplied to the processor.

The computer 700 further comprises a random access memory (RAM) or other dynamic storage device as a main memory 725 for storing information and instructions to be executed by the processors 710. Main memory 725 also may be used for storing temporary variables or other intermediate information during execution of instructions by the processors 710. The main memory may include dynamic random access memory (DRAM) and static random access memory (SRAM). DRAM memory may include synchronous dynamic random access memory (SDRAM), Rambus dynamic random access memory (RDRAM), and extended data-out dynamic random access memory (EDO DRAM). The computer 700 also may comprise a read only memory (ROM) 730 and/or other static storage device for storing static information and instructions for the processors 710.

A data storage device 735 may also be coupled to the bus 705 of the computer 700 for storing information and instructions. The data storage device 735 may include a magnetic disk or optical disc and its corresponding drive, flash memory or other nonvolatile memory, or other memory device. Such elements may be combined together or may be separate components, and utilize parts of other elements of the computer 700.

The computer 700 may also be coupled via the bus 705 to a display device 740, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 740 may be or may include an audio device, such as a speaker for providing audio information. An input device 745 may be coupled to the bus 705 for communicating information and/or command selections to the processors 710. In various implementations, input device 745 may be a keyboard, a keypad, a touch-screen and stylus, a voice-activated system, or other input device, or combinations of such devices. Another type of user input device that may be included is a cursor control device 750, such as a mouse, a trackball, or cursor direction keys for communicating direction information and command selections to the one or more processors 710 and for controlling cursor movement on the display device 740.

A communication device 755 may also be coupled to the bus 705. Depending upon the particular implementation, the communication device 755 may include a transceiver, a wireless modem, a network interface card, LAN (Local Area Network) on motherboard, or other interface device. In one embodiment, the communication device 755 may include a firewall to protect the computer 700 from improper access. The computer 700 may be linked to a network or to other devices using the communication device 755, which may include links to the Internet, a local area network, or another environment. The computer 700 may also comprise a power device or system 760, which may comprise a power supply, a battery, a solar cell, a fuel cell, or other system or device for providing or generating power. The power provided by the power device or system 760 may be distributed as required to elements of the computer 700. In an embodiment of the invention, the power system includes a external power converter for one or more processors, the external power converter being controlled by the power control unit of the one or more processors.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A current detector for a microelectronic device comprising:
    a first voltage sensor, the first voltage sensor to measure a first voltage of the microelectronic device during a first time period and a second voltage of the microelectronic device during a second time period; and
    a second voltage sensor, the second voltage sensor to measure the second voltage during the first time period and the first voltage during the second time period;
    where a voltage value is equal to the sum of the first voltage measured by the first sensor plus the first voltage measured by the second sensor, minus the sum of the second voltage measured by the first sensor plus the second voltage measured by the second sensor.

2. The current detector of claim 1, wherein the first sensor and the second sensor are ring oscillator sensors.

3. The current detector of claim 1, wherein the first voltage is a voltage on a first side of a resistance and the second voltage is a voltage on a second side of the resistance.

4. The current detector of claim 3, wherein the resistance carries the current to be measured by the current detector.

5. The current detector of claim 3, wherein the resistance is a parasitic resistance of the microelectronic device.

6. The current detector of claim 1, wherein a current value detected by the current detector is used to control power supplied to the microelectronic device.

7. A microprocessor comprising:
    a resistance; and
    a current detector to detect a current through the resistance of the microprocessor, the current detector comprising a plurality of sensors including a first sensor and a second sensor, the first and second sensors being switched between sources for a measurement.

8. The microprocessor of claim 7, further comprising
a processor core, the processor core to execute instructions;
a power connection to an external power converter, the processor core receiving power from the external power converter; and
a power control unit to control the external power unit, the power control unit to provide control signals to the external power unit based at least in part on measurements of the current detector.

9. The microprocessor of claim 7, wherein the first sensor measures a first voltage during a first time period and the second sensor measures a second voltage during the first time period.

10. The microprocessor of claim 9, wherein the first sensor measures the second voltage during a second time period and the second sensor measures the first voltage during the second time period.

11. The microprocessor of claim 7, wherein the first sensor and the second sensor are ring oscillator sensors.

12. The microprocessor of claim 7, wherein a control signal is based at least in part on a current value detected by the current detector.

13. The microprocessor of claim 7, further comprising:
a plurality of current detectors to detect a plurality of currents through a plurality of resistances in the microprocessor;
each current detector comprising a plurality of sensors including a first sensor and a second sensor, the first and second sensors being switched between sources for a measurement.

14. The microprocessor of claim 13, further comprising a plurality of processor cores, wherein each current detector of the plurality of current detectors detects a current of a processing core of the plurality of processing cores.

15. The microprocessor of claim 14, wherein each of the plurality of processor cores is substantially similar to the other processor cores.

16. The microprocessor of claim 7, wherein at least one voltage supply to the microprocessor is based at least in part on a current value detected by the current detector.

17. A method for determining an electrical current through a resistance of a microelectronic device comprising:
measuring a first voltage potential at an upstream location from the resistance during a first time period;
measuring a second voltage potential at a downstream location from the resistance during the first time period;
measuring a third voltage potential at the downstream location from the resistance during a second time period; and
measuring a fourth voltage potential at the upstream location from the resistance during the second time period.

18. The method of claim 17, further comprising calculating a voltage value equal to the sum of the first voltage potential and the fourth voltage potential minus the sum of the second voltage potential and the third voltage potential.

19. The method of claim 18, wherein the first voltage potential and the third voltage potential are measured by a first sensor, and the second voltage potential and the fourth potential are measured by a second sensor.

20. The method of claim 19, wherein the first sensor and the second sensors are ring oscillator sensors.

21. The method of claim 17, wherein the microelectronic device is a microprocessor.

22. The method of claim 17, further comprising modifying at least one voltage supply to the microprocessor based at least in part on a current value detected by the current detector.

23. The method of claim 17, further comprising generating a power control signal for the microelectronic device based at least in part on the current measurement.

24. A computer system comprising:
a processor, the processor including a current detector including a plurality of voltage sensors, a measurement process for the current detector including switching the sources of the voltage sensors; and
a dynamic random access memory (DRAM) for storage of instructions and data for the processor.

25. The computer system of claim 24, wherein the plurality of voltage sensors includes a first sensor and a second sensor.

26. The computer system of claim 25, wherein the first sensor is to measure a first voltage during a first time period and a second voltage during a second time period, and wherein the second sensor is to measure the second voltage during the first time period and the first voltage curing the second time period.

27. The computer system of claim 26, where the current detector is to use a delta value equal to the sum of the first voltage measurements minus the sum of the second voltage measurements.

28. The computer system of claim 24, wherein the first sensor and the second sensor are each a ring oscillator sensor.

* * * * *